United States Patent [19]

Bernander et al.

[11] 4,371,031

[45] Feb. 1, 1983

[54] ARRANGEMENT FOR AIR CONDITIONING CONTROL IN BUILDINGS

[75] Inventors: Karl-Gustav Bernander; Lars Skogström, both of Stockholm, Sweden

[73] Assignees: Aeromator Trading Co. AB; AB Strangbetong, both of Stockholm, Sweden

[21] Appl. No.: 198,105

[22] PCT Filed: Oct. 25, 1979

[86] PCT No.: PCT/SE79/00218

§ 371 Date: Jun. 25, 1980

§ 102(e) Date: Jun. 12, 1980

[87] PCT Pub. No.: WO80/00858

PCT Pub. Date: May 1, 1980

[30] Foreign Application Priority Data

Oct. 25, 1978 [SE] Sweden .................................. 7811114

[51] Int. Cl.³ .............................................. F24H 3/02
[52] U.S. Cl. ........................................ 165/54; 165/56; 52/303; 52/405; 98/42 A; 252/70; 126/429
[58] Field of Search .................... 165/53, 54, 56, 57, 165/48 S; 98/31, 33 A, 42; 52/303, 302, 405; 126/429, 431, 400; 252/70

[56] References Cited

U.S. PATENT DOCUMENTS

| 3,633,659 | 1/1972 | Ohlsson | 165/56 |
| 4,258,701 | 3/1981 | Buckley | 126/431 X |
| 4,269,171 | 5/1981 | McArthur | 126/429 |
| 4,295,415 | 10/1981 | Schneider | 98/31 |
| 4,296,798 | 10/1981 | Schramm | 165/56 |

FOREIGN PATENT DOCUMENTS 2727127  1/1978  Fed. Rep. of Germany ........ 52/303

Primary Examiner—Samuel Scott
Assistant Examiner—Margaret A. Focarino
Attorney, Agent, or Firm—Holman & Stern

[57] ABSTRACT

Air condition control for buildings, having a roof structure of roof trusses relatively widely spaced, between which self-supporting roof plates are laid and covered by a covering layer so that a gap is formed between the covering layer and the roof plates. Air is passed in one or the other direction through a ventilation opening in the roof, through the air gap (13) and through ducts (9) in the roof plates. Air sucked in from the atmosphere through the ventilation opening passes through the ducts to an air conditioning unit (5) and to a distribution device (6) to maintain a suitable temperature in the building. Air flow can also be inverted by being supplied in the form of outdoor air to the air conditioning unit (5) and after its passage through the building being conducted away into the atmosphere through the roof structure by the ventilation opening.

8 Claims, 10 Drawing Figures

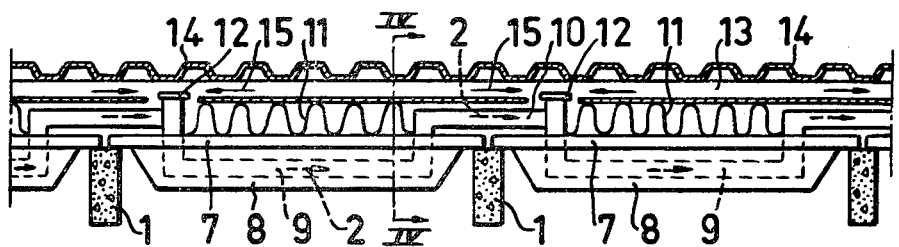
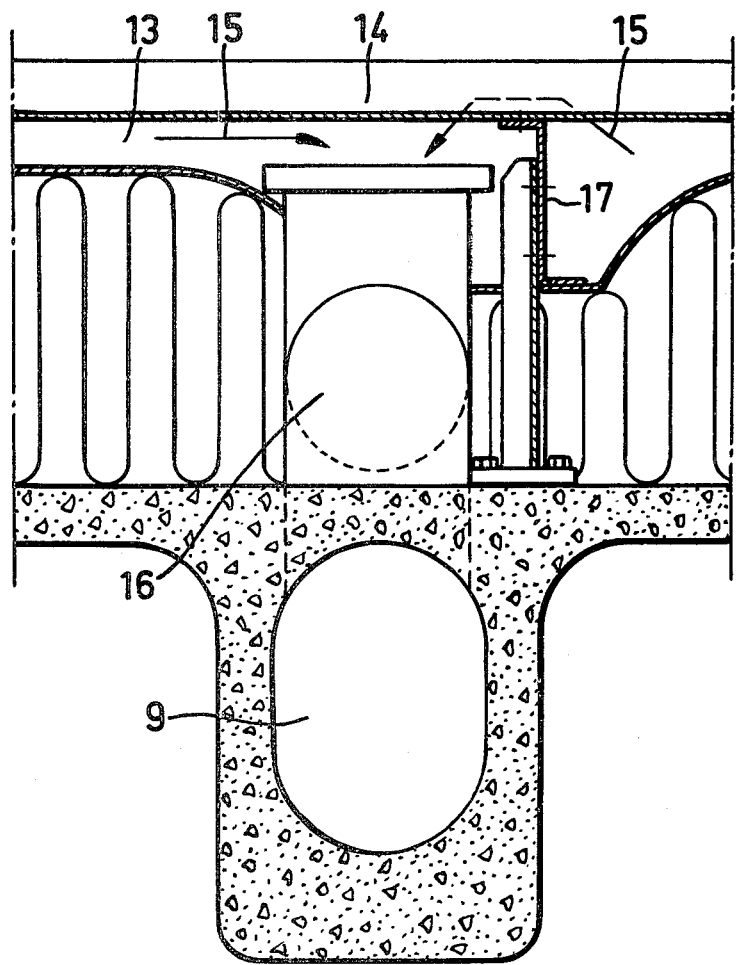

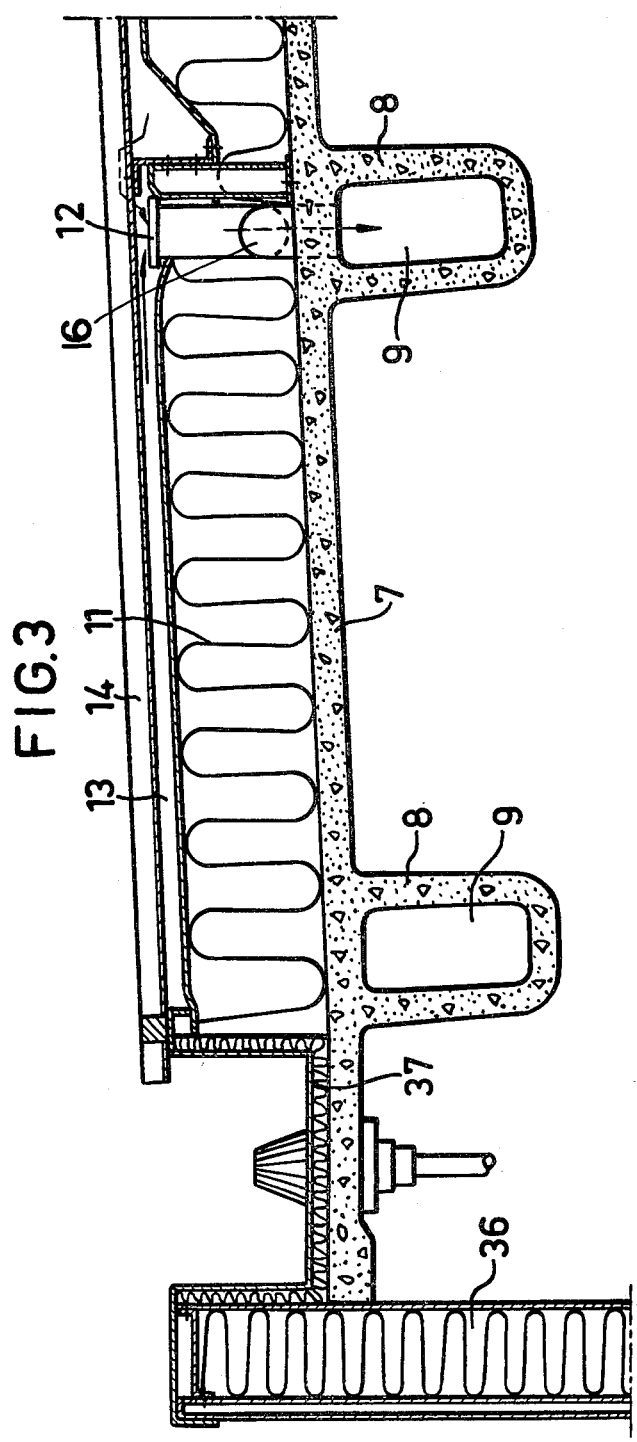

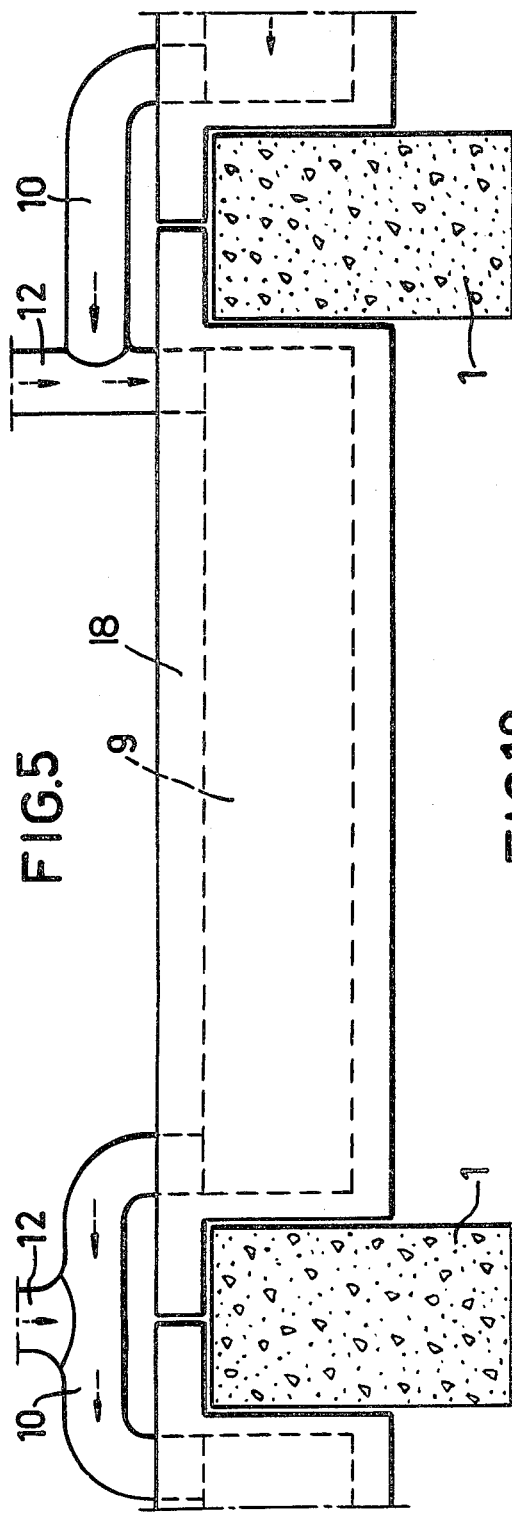
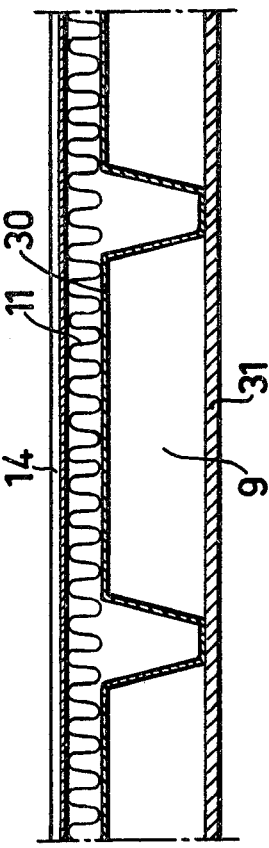

ARRANGEMENT FOR AIR CONDITIONING CONTROL IN BUILDINGS

FIELD OF THE INVENTION

This invention relates to an arrangement for controlling the air condition in buildings, wherein the roof comprises plates with substantial mass which are self-supporting with a relatively wide span, and a covering layer laid on the outside of the roof plates, between which layer and plates a gap for air exchange with the atmosphere is located and air is passed therethrough.

DESCRIPTION OF THE PRIOR ART

Co-operation between the carrying building structure and ventilation installations heretofore has been utilized to a relatively limited extent for controlling the air condition in a building. Some examples, however, of such integration do exist. Roofs of hall buildings, for example, comprise plates, which are assembled of concrete elements with TT-shaped cross-section and cover long spans. It was found that such concrete roofs, owing to the relatively high heat capacity of concrete, during successive warm summer's days yield air conditions, which are substantially better than those yielded by roofs of a lighter weight with corresponding insulation. In winter-time also certain savings in energy could be obtained. An improved roof construction of this kind implies, that the concrete plate is provided with a covering layer of sheet metal instead of asphalt roofing felt and the like. Such a concrete-sheet metal roof renders possible ventilation of the air gap between insulation and covering layer and thereby offers special advantages.

In connection with the use of precast elements for multi-storey buildings, floor elements with longitudinal holes have been utilized for branching the ventilation system. At a specific design of such floors, the heat storage capacity in the hollow floor has been utilized systematically in such a manner, that in summer-time the cool night air can be used for cooling the building on warm days and that in winter-time excess heat produced during the day can be stored for heating purposes during nights and holidays.

A closely related development refers to so-called exhaust air windows, where the transmission losses of heat are reduced by windows acting as solar collectors. The warm air from the windows is passed into the building, and consideration was made of the possibility of storing this heat in the building structure, for example in the floors.

BRIEF SUMMARY OF THE INVENTION

The present invention, relates to buildings, the roof constructions of which, briefly, comprise roof trusses, which are arranged with relatively widely spaced relationship and between which self-supporting roof plates are located. The roof plates are covered by a covering layer in such a manner, that a gap is formed between the covering layer and the roof plates. The invention is particularly suitable for industrial buildings. According to the invention air is passed in one or the other direction through ducts provided in the roof. When the air is sucked in from the atmosphere through ventilation cowls and passes through said means, the air is led to an air conditioning unit and to a distribution device of some kind within the building for the purpose of maintaining a suitable temperature in the building. The air can also be led in the inverted direction and, thus, be taken up in the form of outdoor air by the air conditioning unit and after having been passed through the building be conducted away through the roof structure into the atmosphere by the ventilation cowls.

The invention, comprises an arrangement which is characterized in that the plates are formed with ducts, which at one end have an opening, which is connected both to the air conditioning unit and to intakes from the building and which has one or more upward connections to the air gap located thereabove. Several plates can be arranged one after the other, and the ducts can be connected by suitable pass-over means, which may have openings in connection with the air gap. Especially suitable are roof plates of concrete with TT-shaped cross-section, in which the ducts are laid in the beam webs. The covering layer in this design preferably consists of corrugated sheet metal, which is laid spaced from the upper surface of the plate so that a gap is formed.

By applying a number of operation cases to the ventilation of a building, substantial technical effects with respect to the air condition and especially to energy economy in the building can be achieved.

When the ventilation air is sucked in from the air gap into the ducts of the roof plates, the effects related below can be obtained.

Heat is recovered on occasions when the sheet metal roof acts as a solar collector.

Transmission heat (leakage heat) through the insulation to the gap beneath the covering layer is returned into the building. The excess heat in the air in the upper part of the building which is substantial at great room heights, is supplied to the roof plates through heat transmission and is recovered by the ventilation air flowing through the ducts. The roof framing acts here as a heat exchanger.

Due to the heat taken out with ventilation air in the ducts of the roof framing, the air temperature in the upper part of the building is lowered. The temperature difference between indoor and outdoor air decreases, and the total heat transmission losses through the roof decrease.

Owing to the possibility of positioning the connecting openings through the insulation between the air gap and the ducts in the roof plates (cold zones) in connection with the necessary supports for the propped covering layer, the thermal bridge effect of the openings is reduced substantially.

When the roof is covered with snow, the gap ventilation prevents the snow from melting at the covering layer as long as the outdoor temperature is below 0° C., whereby the insulating capacity of the snow layer is utilized, while the melting is accelerated when the outdoor temperature is higher than 0° C., so that the roof plate is exposed more rapidly and can act as a solar collector.

Ventilation through the gap eliminates the risks of moisture damage to the insulation by leakage water through the covering layer or by condensation in the gap space.

The temperature variations, and thereby the movements in the covering layer (roof metal sheet) are reduced because the layer is cooled by the air flow.

The heat accumulation capacity of the roof plates can be utilized for time-shifted heaing with periodic excess heat or cooling of the room during day-time with cold accumulated during the night.

The roof plates can be cooled efficiently with the ventilation air in the event of fire, so that the resistance against fire is increased substantially.

The effects of unintentional ventilation by leaks in the roof are eliminated, in that such ventilation is caught in the gap.

When ventilation air instead is supplied to the gap from the hollow ducts, i.e. when the system is used contrary to the direction described above, the effects related below can be obtained.

The roof framing can be cooled with outdoor air from the ducts and an air conditioning unit during warm summer-days.

This also brings about a substantial temperature decrease in the air gap, so that the covering layer (roof metal sheet) is cooled and extreme temperature movements in the covering layer are prevented when the roof is exposed to solar radiation on warm summer-days.

When outlets for the ventilation air are positioned at ridges in the form of separate fans, an added natural ventilation effect is achieved.

Due to the lowered temperature in the air gap, the inward heat leakage through the insulation in warm weather is reduced substantially.

In the case when the roof plates consist of TT-shaped concrete sections, the following degrees of freedom, which are essential for a cold roof, are obtained:

1. Roof openings with sufficient width for smoke lids, roof units etc. can be positioned substantially in any place between the carrying beams of the TT-concrete plate, irrespective of whether it is carried out during the manufacturing process, at the assembly of the building or at its conversion. These recesses can be made without requiring the TT-concrete plate to be lintelled.

2. The width of the plate can be varied for single elements with non-modular length or width without giving rise to disturbing production difficulties.

3. Sound-insulating slabs can be mounted between the beam portions of the TT-concrete plates without thereby appreciably obstructing heat exchange with the indoor air at the roof level.

It can be suitable at times not to use certain of the hollow ducts in the roof plates. This may apply, for example, to hollow ducts near gutters adjacent a facade, because hereby the gutter will not be cooled so much that the water freezes and locks the gutter with the known consequences resulting therefrom.

BRIEF DESCRIPTION OF THE DRAWINGS

The invention is described in greater detail hereinafter with reference to the accompanying drawings. The description refers to a roof construction where the roof plates consist of concrete elements, so-called TT-concrete plates, which are covered with corrugated sheet metal. The invention, however, must not be regarded as restricted to the embodiment described, because other sectional configurations of concrete elements and also forms of roof plates other than concrete elements and covering layers other than corrugated sheet metal may be used.

FIG. 2 is a portion of a longitudinal cross-sectional view on an enlarged scale through the roof structure taken along line II—II in FIG. 1, FIG. 3 is a portion of a cross-sectional view on an enlarged scale taken along the line III—III in FIG. 1, FIG. 4 is a cross-sectional view on an enlarged scale taken along the line IV—IV in FIG. 2, FIG. 5 is a portion of a longitudinal cross-sectional view showing a TT-concrete roof plate arranged according to the invention similar to FIG. 2 and on a larger scale, FIG. 10 shows a modified roof shape in accordance with the invention.

DETAILED DESCRIPTION

Figure 1:
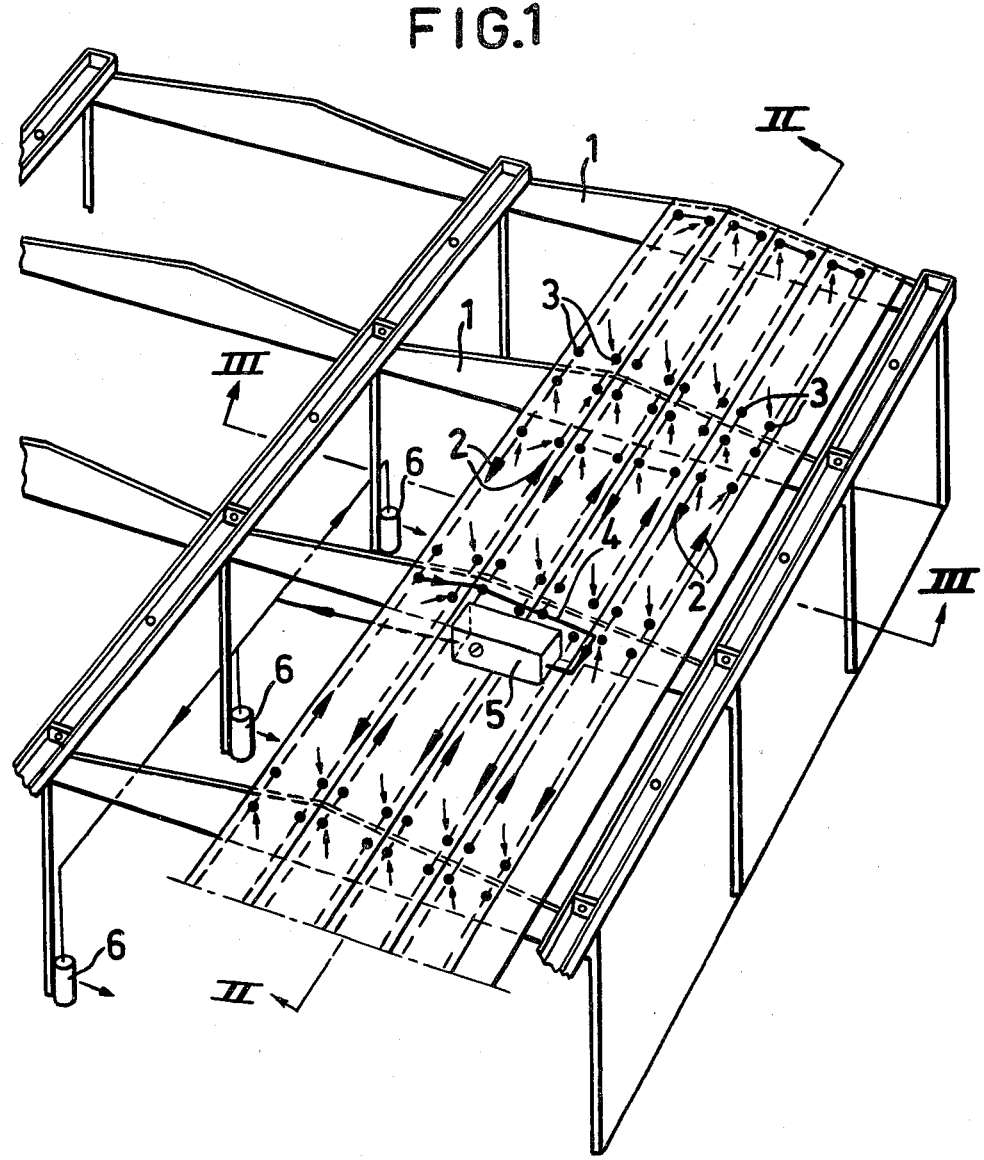
FIG. 1 is a perspective, schematic view of a concrete structure for an industrial building with several aisles and with a roof structure for utilizing the invention.

In FIG. 1 a building constructed according to the present invention is shown schematically and perspectively. The roof of the building is indicated only schematically, in that the roof trusses 1 are shown and supported in a conventional manner. With reference to FIG. 1, the invention, briefly, can be explained as follows. Between an outer covering layer of corrugated sheet metal and the roof in the form of concrete elements a gap is located. In the roof plates, i.e. concrete elements, ducts extend in the direction tranversely to the roof trusses 1. The ducts are indicated in FIG. 1 by the arrows 2. The dots 3 indicate openings from the gap downward to the ducts. All ducts open into a main pipe 4, which then extends to an air conditioning unit 5. From said unit extend conduit connections to supply-air terminal devices 6, for example of low-impulse type, which are located downwardly in the building and supply the building with conditioned air for heating and ventilation.

In FIG. 2, which is a longitudinal section on an enlarged scale along the line II—II in FIG. 1, can be seen how the roof plates 7 are laid between the roof trusses 1. The arrows 2 are the same as in FIG. 1 and indicate the air flow through ducts 9 formed in the beam webs 8 of the roof plates. As appears from the Figure, connection exists between two plates 7 located one after the other, which connection is indicated by the reference numeral 10. Said connection implies a connecting device, which is located above the plates 7 and in the insulation 11 laid above the plates. The pass-over devices 10 have an opening 12, which opens into the gap 13 laid between the roof plate 7 and the covering layer 14 in the form of a corrugated metal sheet. FIG. 2 illustrates how the pass-over devices 10 are positioned at each roof truss 1, and each pass-over device has an opening 12 at said gap. It is also to be mentioned, that the gap is located between the insulation 11 and the lower surface of the covering layer 14. The arrows 2, thus, indicate the air flowing through the ducts in the roof plates, and the arrows 15 indicate the air flowing in said gap.

FIG. 3 is a section along the line III—III in FIG. 1, where the left-hand portion of the Figure shows the wall 36 of the building which supports the gutter valley 37 and the roof plate 7. The ducts 9 extend through the beam webs 8 of the roof plates 7. Above the roof plates 7 the insulation 11 is located, and between the insulation 11 and the covering layer extends the gap 13. As can be seen, the right-hand one of the two ducts 9 includes a pipe connection 16, which extends downward to the duct 9 from the gap 13. In addition to the connection 12 shown in FIG. 2, thus, further connecting places are located between the gap 13 and the ducts 9. The connecting places preferably shall be so distributed that a uniform flow condition for air from the gap 13 to the ducts 9, or vice versa, is obtained. Furthermore, a certain number of sealings (not shown) preferably can be inserted with certain spaced relationship between the covering layer and the roof plate transversely to the roof trusses. Said sealings guide the flow of the air in the gap 13, and a suitable distribution of the air flow can be obtained.

FIG. 4 is a section along the line IV—IV in FIG. 2 and differs from the section according to FIG. 3 only in that the scale is slightly greater and the longitudinal extension of the section is shortened. In FIG. 4 can be seen both the duct 9 in the roof plate and the connecting pipe 16 from the gap 13 to the duct 9. The arrows 15 indicate the air flow from the gap 13 into the downward pipe 16. According to the right-hand arrow 15, the air flows over an attachment bar 17, which carries the covering layer in the form of the corrugated sheet 14. Where said bar abuts the lower corrugations, a passage exists in the wave troughs above the bar 17. This prevents or eliminates a thermal bridge arising via the bar 17 from the corrugated metal sheet 14. The opening 12 of the pass-over device 10 can open into a distribution pipe (not shown) on the bar 17 which distributes the air upward along the lower surface of the metal sheet.

FIG. 5 is a sectional view similar to FIG. 2 showing a TT-concrete roof plate, which is provided with beam webs 18 suitably distributed and extending between the roof trusses 1. The roof plates hereby are self-supporting. The beam webs 18 include the aforementioned ducts 9, and two different embodiments of the pass-over devices 10 are shown. In the left-hand embodiment the pass-over device is fork-shape with two legs of equal length. The opening 12 to the gap 13, thus, is located symmetrically relative to the legs. In the right-hand embodiment the opening 12 is located directly in front of one of the legs in the pass-over devices 10. Thus, the pass-over devices 10 act to transfer air from the ducts 9 in one plate to corresponding ducts 9 in an adjacent plate and to take in or remove air from the gap 13.

Figure 6:
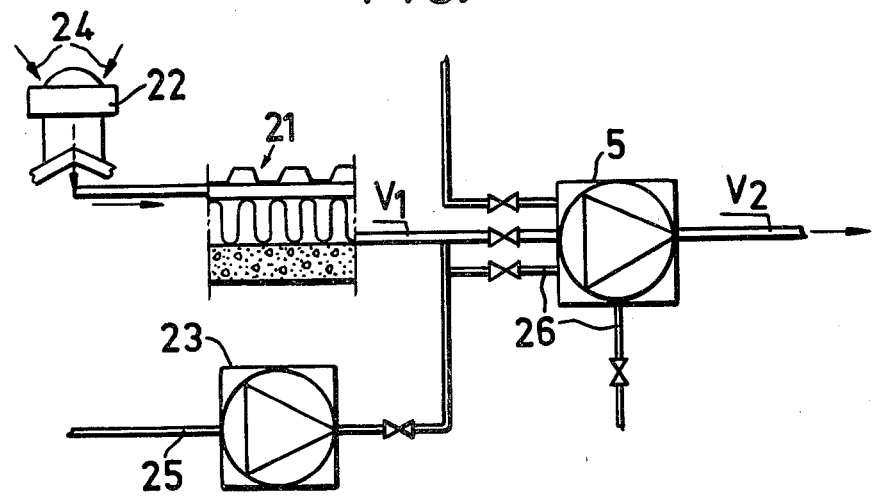
FIG. 6 is a flow-sheet for an operation case 1 according to the invention.

In the following, four operation cases are described with reference to FIGS. 6-9, which schematically illustrate the air flow. Thicker lines indicate that air flow takes place. The numeral 21 refers to the schematically shown cross-section of the roof structure described above, 5 designates the aforementioned air conditioning unit, 22 designates a ventilation cowl on the ridge, and 23 is a fan for outdoor air intake. The operation case illustrated in FIG. 6 is applied during day-time as long as the temperature $v_1$ in the main duct to the air conditioning unit 5 during day-time is lower than or equal to the desired supply-air temperature $v_2$ after the air conditioning unit. The air is passed from the air conditioning unit in a suitable way, for example via supply-air terminal devices 6 (see FIG. 1), to the interior of the building. The outdoor air being used, thus, is the air which flows through the ventilation cowls 22 according to the arrows 24. The fan 23 can suck in air through the opening 25, but as mentioned it is not the case in the operation case 1. Through a conduit 26, furthermore, return air can flow out into the ambient atmosphere. Said conduit 26 is closed in this operation case 1.

Figure 7:
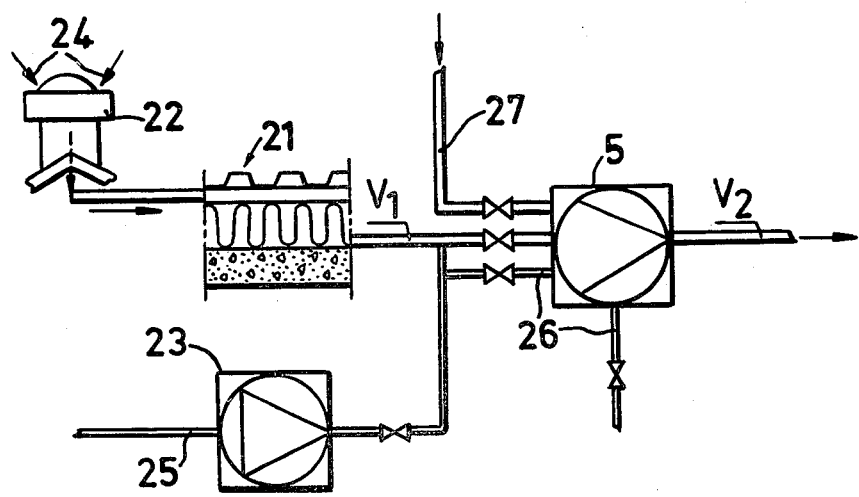
FIG. 7 is a flow-sheet shown in the same way for an operation case 2.

As regards operation case 2, see FIG. 7. When the temperature $v_1$ exceeds the desired supply-air temperature $v_2$, the operation case according to FIG. 7 arises, in which a mixture of outdoor air is supplied to the air conditioning unit 5 via the ventilation cowls 22 and a direct inlet. In this connection is to be added, that the operation case 1 is limited thereto by a lowest acceptable temperature on the inner surface of the roof. This lowest temperature can be limited, for example, by the risk of condensate precipitation on the inner surface of the roof or by a lower comfort limit for human beings with respect to radiation cooling.

Figure 8:
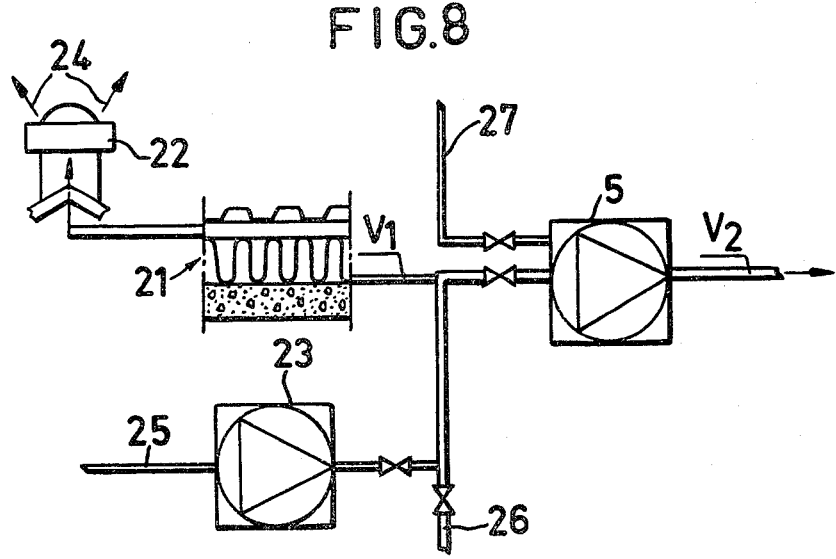
FIG. 8 is a flow-sheet for an operation case 3.

As regards operation case 3, see FIG. 8. The operation case 3 is applied in night-time after a day with the operation cases 1 and 2. It is apparent from this Figure that then only a circulation takes place through the building and the air conditioning unit 5, in that the return air from the interior of the building is taken in at the conduit 26, and its temperature is maintained in the air conditioning unit 5. Through the roof construction 21 only ventilation by natural draught takes place by means of the ventilation cowls 22. This is indicated by the arrows 24. No outdoor air is taken in via the conduit 27, and the operation case 3 presupposes that no appreciable activity occurs in the building during night-time.

Figure 9:
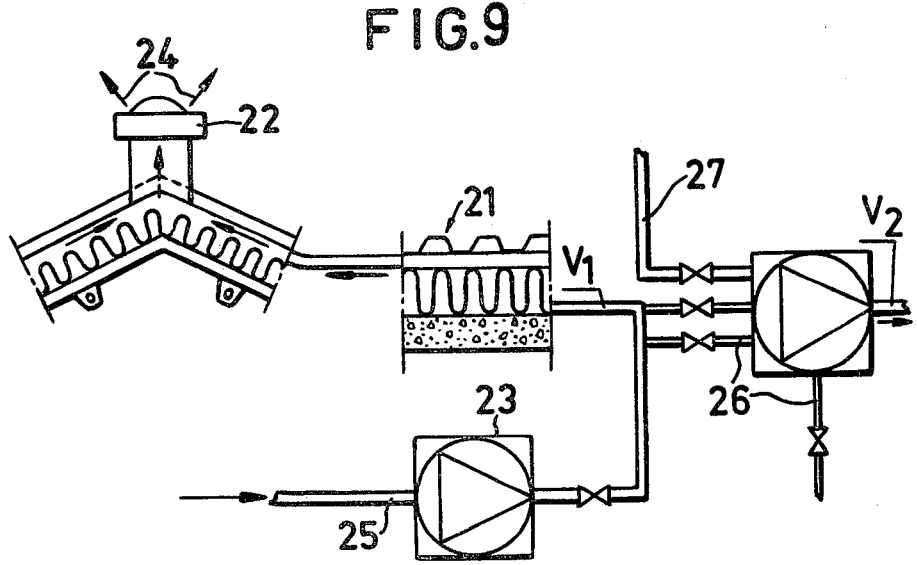
FIG. 9 is a flow-sheet for an operation case 4.

As regards operation case 4, see FIG. 9. In this operation case the outdoor air is supplied directly via the conduit 27 to the air conditioning unit 5 where its temperature is determined, and the air then is supplied to the building. The return air from the interior of the building flows into the conduit 26 and is passed on to the roof construction 21 by overpressure in the building and by means of draught from the ventilation cowls 22. Outdoor air can be supplied directly via the conduit 25 to the roof structure. The operation case 4 is actuated when the amount of outdoor air from the roof structure 21, i.e. the air gap and the hollow ducts of the roof framing, decreases to zero. This operation case is applied also at night-time or such day ending with the operation case 2. At the time of return to day operation on the following day, the temperature difference between the exhaust air from the roof and the outdoor air temperature is sensed. When this temperature difference falls below a certain value, operation case 2 is applied. Otherwise operation case 4 is continued. It is to be observed that said temperature is decisive for the operation cases and said temperature differences must be determined for each individual case, because they vary with the design and utilization of the building.

As an example it can be mentioned that, if the temperature for the return air is higher than the temperature for the outdoor air, the conduit 26 can be closed so that the return air flows directly to the ambient while only outdoor air is supplied to the roof structure via the conduit 25 and the fan 23.

As regards the air conditioning unit 5 may be added, that this unit may comprise e.g. a heat exchanger of a suitable type, for example a regenerative heat exchanger or a recuperative one. In such operation case when a recuperative heat exchanger is connected in series with the roof structure (gap and ducts), the following advantages are obtained:

(1) Higher total efficiency degree;
(2) Downward adjustment of the liquid flow in the air heat exchanger for defrosting the exchanger is not required;

(3) Anti-freeze addition in the form of glycol can be reduced substantially, thereby yielding an improved heat transfer, which results in a higher efficiency degree because no downward adjustment is required.

In the foregoing, an imagined embodiment of the invention has been described with reference to a preferred roof structure for carrying out the invention. As already pointed out, the invention can be applied to other roof structures, provided that an air flow according to the invention can be established. The two important criteria, thus, are that a gap exists between the covering layer and the carrying roof plate, and that said plate includes air ducts. The air shall be passed through the gap and through the ducts for further treatment. The invention also comprises the inverted flow path. The operation cases described fall within the scope of the invention, and in specific cases additional operation cases can be imagined. Such a specific operation case occurs when the roof plate consists of a sheet metal plate 30 (FIG. 10) with a ribbed cross-section, the lower surface of which at least partially is covered with a building slab 31 with high heat storage capacity. The ducts 9 are formed between the slab and the lower surface of the plate. Said slab may consist in known manner of polymer concrete having included therein a salt mixture based on borax and "molten silicic acid" with a suitably balanced melting temperature, about 23° C. The roof plate is shown in FIG. 10. The operation case in this embodiment occurring arises in the night after operation case 1 and 2, and the system is so operated that the indoor air is taken through the heat storing part of the roof, whereby a very active and efficient heat storing function is obtained. In this operation case, thus, a connection is opened between the inside air and the heat storing part of the roof and at the same time the connection between the heat storing part of the roof and the air gap is closed.

We claim:

1. An arrangement for air condition control of buildings of the type having a roof constructed of self-supporting roof plates having substantial mass and a relatively wide span, and a covering layer supported on the outside of the roof plates to provide an air gap between said roof plates and said covering layer for passing air therethrough, comprising ducts formed in said roof plates, an opening in one end of said ducts, an air conditioning unit, air intakes connected to the interior of the building, means for connecting said opening to said air conditioning unit and to said intakes, and one or more upward connecting means connecting said ducts to said air gap located thereabove.

2. An arrangement as defined in claim 1 wherein pass-over conduits are provided for connecting the ducts of several plates in series one after the other.

3. An arrangement as defined in claim 2 wherein said pass-over conduits have an opening comprising said upward connections.

4. An arrangement as defined in claim 1 wherein said upward connections between said ducts and said air gap are of a number and design to provide a substantially uniform air flow in the gap.

5. An arrangement as defined in claim 1 wherein means are provided for air exchange between the gap and the atmosphere comprising a venting device located in the ridge of the roof, said gap being closed at the gutter valleys on the edge of the roof.

6. An arrangement as defined in claim 1 wherein said ducts have transverse connections with ducts of the adjacent roof plate.

7. An arrangement as defined in claim 1 wherein said roof plates comprise concrete elements with TT-shaped cross-section, and said ducts are provided in substantially every beam web of each concrete element.

8. An arrangement as defined in claim 1 wherein said roof plates each comprise a plate having a ribbed cross-section, the lower ribbed surface of which at least partially is covered with a building slab with high heat storage capacity, so that said ducts are formed between said lower surface and the building slab.

* * * * *